(12) United States Patent
Miyasaka

(10) Patent No.: US 12,392,604 B2
(45) Date of Patent: Aug. 19, 2025

(54) MEASUREMENT GUIDE AND COLORIMETRIC SYSTEM

(71) Applicant: SEIKO EPSON CORPORATION, Tokyo (JP)

(72) Inventor: Haruki Miyasaka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 246 days.

(21) Appl. No.: 18/349,200

(22) Filed: Jul. 10, 2023

(65) Prior Publication Data

US 2024/0011771 A1 Jan. 11, 2024

(30) Foreign Application Priority Data

Jul. 11, 2022 (JP) ................................ 2022-111005

(51) Int. Cl.
 *G01J 3/02* (2006.01)
 *G01B 11/27* (2006.01)
 *G01J 3/50* (2006.01)

(52) U.S. Cl.
 CPC ................ *G01B 11/27* (2013.01); *G01J 3/50* (2013.01)

(58) Field of Classification Search
 CPC . G01B 11/27; G01J 3/50; G01J 3/0289; G01J 3/0291; G01J 3/46; G01J 3/0202; G01J 3/28; G01J 3/02; G01N 21/251
 See application file for complete search history.

(56) References Cited

U.S. PATENT DOCUMENTS

| | | | |
|---|---|---|---|
| 6,262,804 B1 * | 7/2001 | Friend | G01J 3/0291 356/402 |
| 2013/0258368 A1 * | 10/2013 | Shigemoto | H04N 1/6044 358/1.9 |
| 2016/0231174 A1 * | 8/2016 | Kanzawa | G01J 3/0202 |
| 2017/0182762 A1 | 6/2017 | Horita | |

FOREIGN PATENT DOCUMENTS

JP 2016070697 A 5/2016

* cited by examiner

*Primary Examiner* — Abdullahi Nur
(74) *Attorney, Agent, or Firm* — CHIP LAW GROUP

(57) ABSTRACT

A measurement guide is a measurement guide for aligning an opening portion of a colorimetric device with a measurement site of a measurement target, the colorimetric device including the opening portion provided at a bottom portion of a device main body and through which light arriving from the measurement target is introduced into the device main body and an incident light processing unit for processing light entering through the opening portion, the measurement guide including a frame configured to form an outer periphery of a concave portion into which the bottom portion is fitted, and a sheet material having translucency and configured to form a bottom surface of the concave portion, wherein the sheet material has a window portion that aligns with the opening portion when the bottom portion is fitted into the concave portion.

8 Claims, 8 Drawing Sheets

MEASUREMENT GUIDE AND COLORIMETRIC SYSTEM

The present application is based on, and claims priority from JP Application Serial Number 2022-111005, filed Jul. 11, 2022, the disclosure of which is hereby incorporated by reference herein in its entirety.

BACKGROUND

1. Technical Field

The present disclosure relates to a measurement guide for aligning a color colorimetric device with a measurement position. Further, the present disclosure relates to a colorimetric system including a measurement guide and a colorimetric device.

2. Related Art

JP 2016-70697 A discloses a measurement position presenting guide. The measurement position presentation guide is obtained by cutting out portions respectively corresponding to a measurement region and an alignment region from a recording medium on which the same image as an image to be printed on a printed matter is printed based on print image data, and is used for colorimetry of the printed matter. When the measurement position presenting guide is disposed at a printing unit, the image printed on the printed matter is exposed in an opening of the alignment region. Then, by a manual operation by an operator, a colorimeter is brought into contact with each measurement region of the printed matter through the opening of the measurement position presenting guide, and colorimetry is performed.

By using the measurement position presenting guide described in JP 2016-70697 A, a position to be measured of the printed matter is presented, but a method for aligning the colorimeter with respect to the opening is not presented. Therefore, there is a possibility that a position shift of the colorimeter occurs with respect to the opening, and in this case, an appropriate colorimetric result is not obtained.

SUMMARY

A measurement guide of the present disclosure in order to solve the above-described problems is a measurement guide for aligning an opening portion of a colorimetric device with a measurement site of a measurement target, the colorimetric device including the opening portion provided at a bottom portion of a device main body and through which light arriving from the measurement target is introduced into the device main body and an incident light processing unit for processing light entering through the opening portion, the measurement guide including a frame configured to form an outer periphery of a concave portion into which the bottom portion is fitted, and a sheet material having translucency and configured to form a bottom surface of the concave portion, wherein a sheet material has a window portion that aligns with the opening portion when the bottom portion is fitted into the concave portion.

Additionally, a colorimetric system of the present disclosure includes a colorimetric device including an opening portion provided at a bottom portion of a device main body and through which light arriving from a measurement target is introduced into the device main body, and an incident light processing unit for processing light entering through the opening portion, and the measurement guide configured to align the opening portion with a measurement site of the measurement target.

BRIEF DESCRIPTION OF THE DRAWINGS

FIG. 2A is a view of a state in which a shutter is closed, and FIG. 2B is a view of a state in which the shutter is opened.

DESCRIPTION OF EMBODIMENTS

Figure 1:
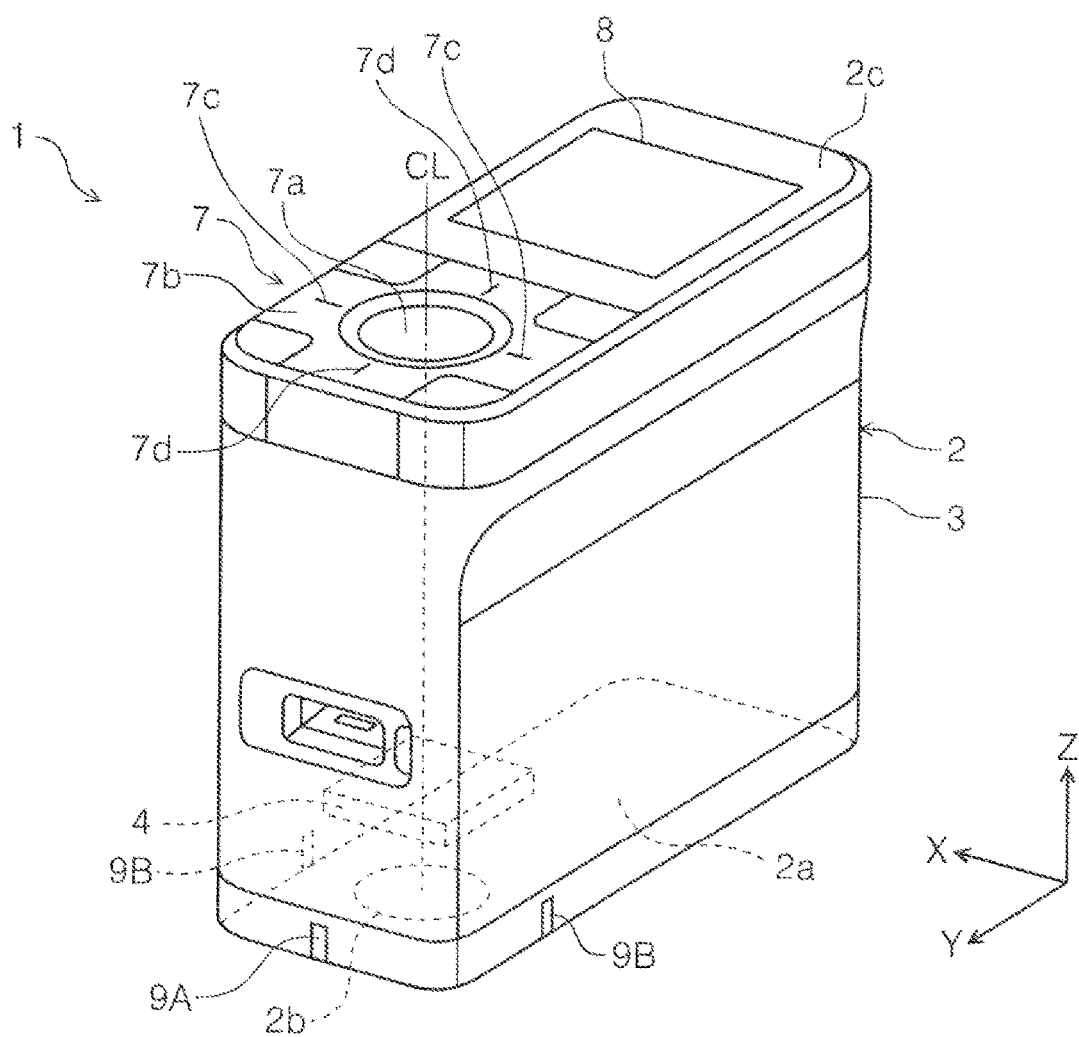
FIG. 1 is a perspective view of a colorimetric device viewed from above.

The present disclosure will be schematically described below.

A measurement guide according to a first aspect is a measurement guide for aligning an opening portion of a colorimetric device with a measurement site of a measurement target, the colorimetric device including the opening portion provided at a bottom portion of a device main body and through which light arriving from the measurement target is introduced into the device main body and an incident light processing unit for processing light entering through the opening portion, the measurement guide including a frame configured to form an outer periphery of a concave portion into which the bottom portion is fitted, and a sheet material having translucency and configured to form a bottom surface of the concave portion, wherein a sheet material has a window portion that aligns with the opening portion when the bottom portion is fitted into the concave portion.

According to the present aspect, the measurement guide has the concave portion and is configured such that the bottom portion of the colorimetric device is fitted into the concave portion. A bottom surface of the concave portion is formed of a sheet material having translucency, and the sheet material is formed with the window portion at a position aligned with the opening portion, that is, overlapping the opening portion in plan view in a state in which the bottom portion is fitted into the concave portion, thus when colorimetry is performed, the window portion of the measurement guide is first aligned with the measurement site of the measurement target. At this time, since the sheet material has translucency, the window portion can be easily aligned with the measurement site. When the bottom portion of the colorimetric device is fitted into the concave portion in this state, since the window portion is formed at the position aligned with the opening portion, that is, overlapping the opening portion in plan view, the colorimetric device can be accurately and easily aligned with the measurement site, and an appropriate colorimetric result can be obtained.

A second aspect is the first aspect, wherein the bottom portion of the colorimetric device has a rectangular shape in plan view, and the frame has a rectangular shape along an outer periphery of the bottom portion and has a line-symmetric shape in a longitudinal direction and a short direction.

According to the present aspect, since the frame has the rectangular shape along the outer periphery of the bottom portion and has the line-symmetric shape in the longitudinal direction and the short direction, a user can handle the measurement guide in the same manner regardless of whether the right hand or the left hand is used.

A third aspect is the second aspect, wherein the opening portion of the colorimetric device is located at a position deviated in a predetermined direction in a longitudinal direction of the bottom portion, and a plurality of the window portions are formed so as to form a line-symmetric positional relationship in the longitudinal direction of the bottom portion.

According to the present aspect, since the opening portion of the colorimetric device is located at the position deviated in the predetermined direction in the longitudinal direction of the bottom portion, and the plurality of window portions are formed so as to form the line-symmetric positional relationship in the longitudinal direction of the bottom portion, the user can use the measurement guide without worrying about orientation of the measurement guide, and usability for the user is improved.

A fourth aspect is the first aspect, wherein an anti-slip portion is formed at an upper surface of the frame.

According to the present aspect, since the anti-slip portion is formed at the upper surface of the frame, operability is improved when the measurement guide is slid with respect to the measurement target.

Note that the present aspect is not limited to the above-described first aspect, and may be applied to the second or third aspect.

A fifth aspect is the first aspect, wherein the sheet material is attached to a bottom surface of the frame, and coating treatment is performed on a surface of the sheet material facing the measurement target.

According to the present aspect, since the sheet material is attached to the bottom surface of the frame, and the coating treatment is performed on the surface of the sheet material facing the measurement target, it is possible to improve wear resistance of the sheet material.

Note that the present aspect is not limited to the above-described first aspect, and may be applied to any one of the second to fourth aspects.

A sixth aspect is the first aspect, wherein an outer periphery of the bottom surface of the frame is chamfered.

According to the present aspect, since the outer periphery of the bottom surface of the frame is chamfered, when the measurement guide is lifted with fingertips, the fingertips are easily caught, and handleability is improved.

Note that the present aspect is not limited to the above-described first aspect, and may be applied to any one of the second to fifth aspects.

A seventh aspect is the first aspect, wherein a position mark indicating a center position of the opening portion is formed at a position of a side surface of the colorimetric device facing the bottom portion, and the concave portion is formed to have such a depth that the position mark is not hidden when the bottom portion of the colorimetric device is fitted.

According to the present aspect, the position mark indicating the center position of the opening portion is formed at the position of the side surface of the colorimetric device facing the bottom portion, and the concave portion is formed to have such a depth that the position mark is not hidden when the bottom portion of the colorimetric device is fitted, thus the position mark is visible even in a state in which the bottom portion of the colorimetric device is fitted into the concave portion. As a result, even in a state in which the colorimetric device is fitted into the measurement guide, a position of the opening portion can be grasped, and convenience for the user is improved.

Note that the present aspect is not limited to the above-described first aspect, and may be applied to any one of the second to sixth aspects.

A colorimetric system according to an eighth aspect includes a colorimetric device including an opening portion provided at a bottom portion of a device main body and through which light arriving from a measurement target is introduced into the device main body, and an incident light processing unit for processing light entering through the opening portion, and the measurement guide according to any one of the first to seventh aspects configured to align the opening portion with a measurement site of the measurement target.

According to the present aspect, in the colorimetric system, the effects of any one of the above-mentioned first to seventh aspects can be obtained.

The present disclosure will be specifically described below.

Note that an X-Y-Z coordinate system illustrated in each figure is an orthogonal coordinate system, an X-Y plane is a horizontal plane, and an X-Z plane and a Y-Z plane are vertical planes.

Additionally, a Z-axis direction is a vertical direction, a +Z direction is vertically upward, and a −Z direction is vertically downward. Further, the Z-axis direction is a direction parallel to an optical axis CL to be described later.

Further, when a colorimetric device 1 is viewed from the Z-axis direction, a Y-axis direction is a longitudinal direction of the device. Additionally, an X-axis direction is a direction orthogonal to the Y-axis direction and when the colorimetric device 1 is viewed from the Z-axis direction, is a short direction of the device.

In the present specification, a configuration of the colorimetric device 1 and the measurement guide 20 will be described assuming that the device is placed on a placement surface parallel to the horizontal plane and the longitudinal direction of the colorimetric device 1 is along the Y-axis direction.

Figure 2A:
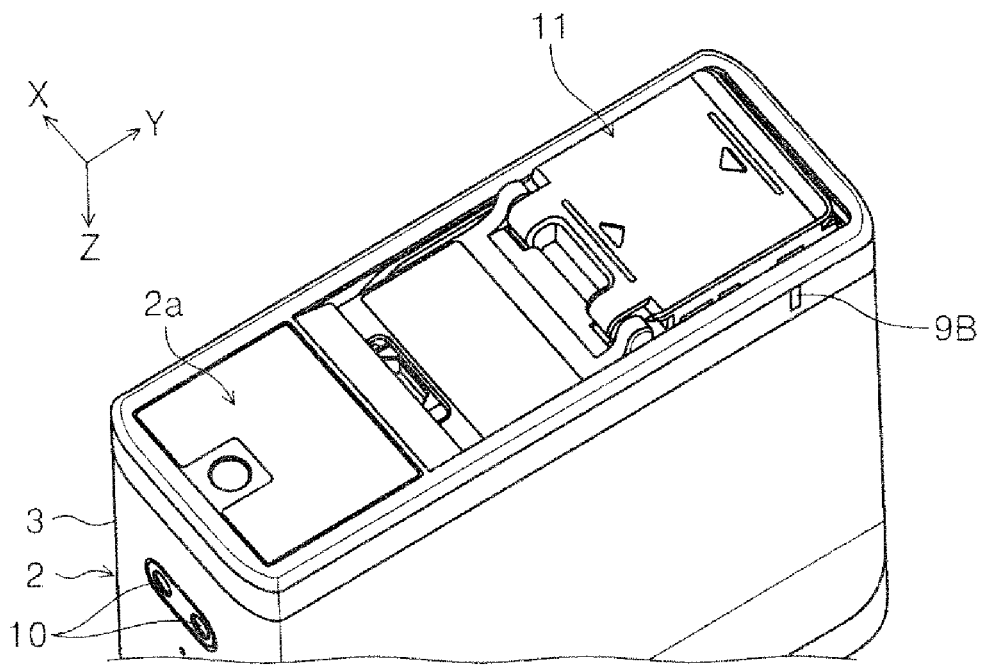
FIGS. 2A and 2B are perspective views of the colorimetric device viewed from below.
Figure 2B:
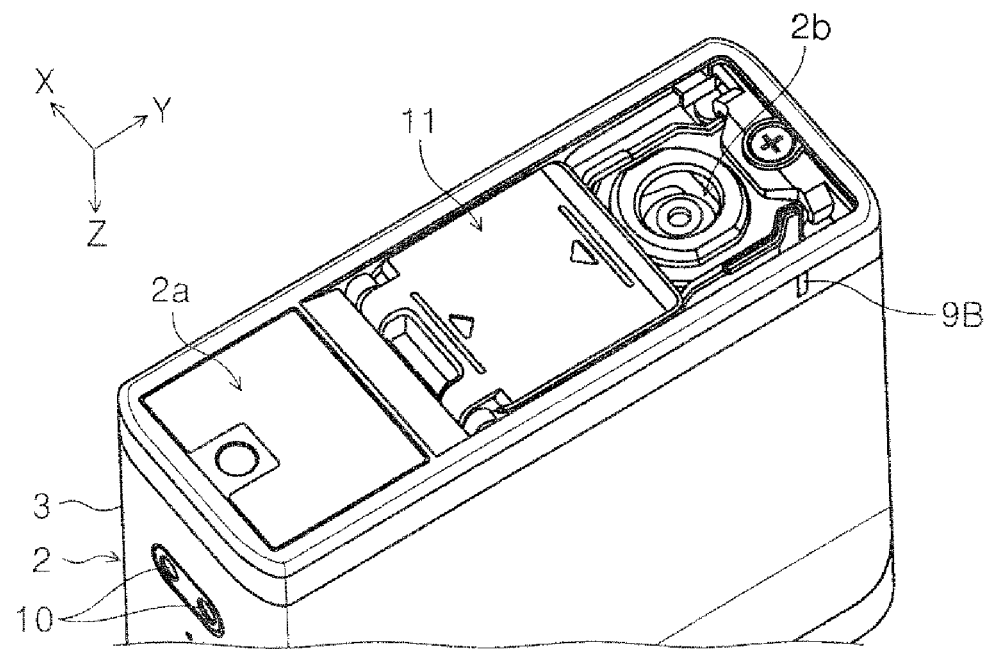

In FIGS. 1, 2A, and 2B, the colorimetric device 1 is a device that performs colorimetry on a measurement site Ga (see FIG. 7) of a measurement target G (see FIG. 7) and displays a colorimetric result on a display unit 8 or transmits the colorimetric result to a computer (not illustrated).

The colorimetric device 1 according to the present embodiment is a handheld type device that can be held and handled by a user with one hand. The colorimetric device 1 includes, inside the device main body 2, a battery (not illustrated) which is a power supply source of the device, an incident light processing unit 4 which processes incident light and additionally a light emitting unit (not illustrated) which emits light toward the measurement target G. Although a detailed description of the incident light processing unit 4 is omitted, the incident light processing unit 4 includes an optical filter (not illustrated) in the present embodiment.

The optical filter selectively transmits any wavelength component of light entering is introduced into the device. The light transmitted through the optical filter is incident on a photoreceptor element (not illustrated), specifically, a photodiode. Then, intensity of the incident light is converted into a voltage value and output to a control unit (not illustrated). The colorimetric device 1 measures a spectrum of a target of colorimetry by repeatedly performing wavelength selection by the above-described optical filter and acquisition of light reception intensity. In the present embodiment, the optical filter is a wavelength-tunable Fabry-Perot etalon, which is a wavelength filter using multiple interference of two opposing reflection surfaces. Of course, the incident light processing unit 4 is not limited to the configuration including such an optical filter. The wavelength-tunable Fabry-Perot etalon is configured to select a wavelength by controlling an interval in an optical axis direction between a pair of mirrors (not illustrated) disposed to face each other with an interval in the optical axis direction.

An outer shell of the device main body 2 is constituted by a housing 3. An opening portion 2b is formed at a bottom portion 2a of the device main body 2, and incident light directed from a target of colorimetry G toward the incident light processing unit 4 is taken into the inside of the device through the opening portion 2b. The opening portion 2b is an opening portion that has a perfect circular shape centered on the optical axis CL. The optical axis CL is an optical axis of incident light directed from the target of colorimetry to the incident light processing unit 4.

A light-emitting unit (not illustrated) is provided inside the opening portion 2b, and light emitted from the light-emitting unit is directed to an outside of the device via the opening portion 2b and irradiates the measurement site facing the opening portion 2b.

The opening portion 2b can be covered with a shutter 11 as illustrated in FIG. 2A. The shutter 11 switches between a closed state of covering the opening portion 2b as illustrated in FIG. 2A and an open state of opening the opening portion 2b as illustrated in FIG. 2B by being slid in the Y-axis direction. The shutter 11 is opened and closed by being slid by the user with user's fingers caught on the shutter 11.

An operation unit 7 for performing various operations and the display unit 8 for displaying various types of information are provided at an upper surface 2c of the device main body 2.

The user holds and uses the colorimetric device 1 with one hand in a state in which the display unit 8 faces the user. At this time, the operation unit 7 is at a position where the operation unit 7 can be operated by the user's fingers. The operation unit 7 includes a determination button 7a at a center, and by pressing the determination button 7a, various settings can be determined and colorimetry can be performed. Further, the operation unit 7 includes a cross key 7b, and various items can be selected and settings can be changed by the cross key 7b.

The determination button 7a is disposed at a central portion of the cross key 7b, and the cross key 7b has a shape extending up, down, left and right from the central portion. In the cross key 7b, horizontal marks 7c extending in a left-right direction are attached to left and right key portions, and vertical marks 7d extending in an up-down direction are attached to upper and lower key portions.

The determination button 7a has a perfect circular shape in plan view, and a center position thereof coincides with a position of the optical axis CL. Additionally, a position at which a virtual line (not illustrated) obtained by extending the horizontal mark 7c and a virtual line (not illustrated) obtained by extending the vertical mark 7d intersect with each other corresponds to the position of the optical axis CL.

Such a configuration facilitates alignment of a colorimetric position when the colorimetric device 1 is viewed in plan view.

Further, position marks 9A and 9B are provided at positions of side surfaces of the device main body 2 facing the bottom portion 2a. The position mark 9B is located on the virtual line (not illustrated) obtained by extending the horizontal mark 7c in plan view. The position mark 9B is a mark indicating a center position of the opening portion 2b in the Y-axis direction. In addition, the position mark 9A is located on the virtual line (not illustrated) obtained by extending the vertical mark 7d in plan view. The position mark 9A is a mark indicating a center position of the opening portion 2b in the X-axis direction. Such position marks 9A and 9B also facilitate the alignment of the colorimetric position.

As illustrated in FIGS. 2A and 2B, a strap hole 10 is formed at a side surface of the device main body 2 in a −Y direction, and by passing a strap (not illustrated) through the strap hole 10, portability of the colorimetric device 1 can be improved. Note that it is also suitable to form a strap hole also at the measurement guide 20 to be described later and link the colorimetric device 1 and the measurement guide 20 with a strap.

Figure 3:
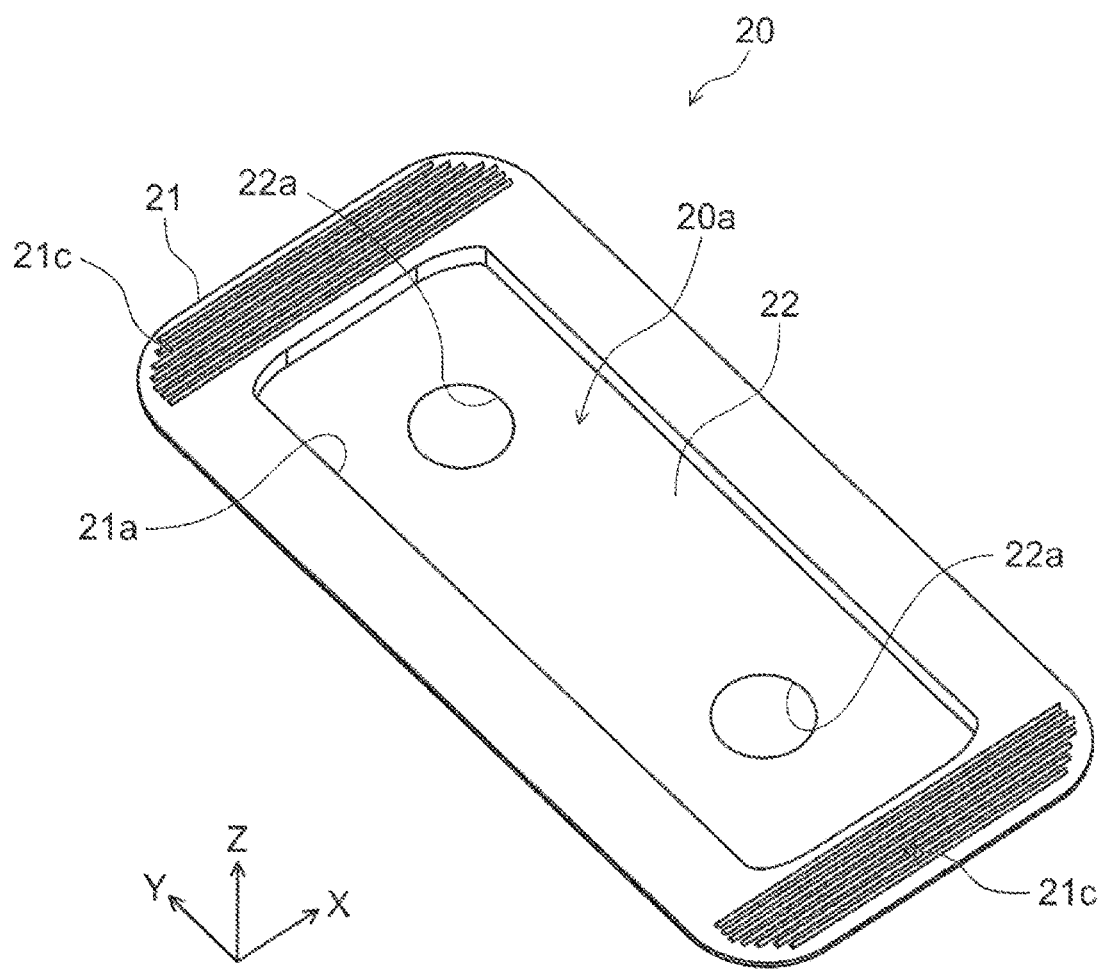
FIG. 3 is a perspective view of a measurement guide viewed from above.

Next, the measurement guide 20 will be described with reference to FIG. 3 and subsequent figures. The measurement guide 20 is a guide for aligning the opening portion 2b of the colorimetric device 1 with the measurement site Ga (see FIG. 7) of the measurement target G (see FIG. 7) and is configured such that a bottom portion t of the colorimetric device 1 can be fitted into a concave portion 20a. An outer periphery of the concave portion 20a is constituted by a frame 21, and a bottom surface of the concave portion 20a is formed by a sheet material 22 which is a sheet material and has translucency. At the sheet material 22, a window portion 22a is formed that is aligned with the opening portion 2b of the colorimetric device 1 in a state in which the bottom portion 2a is fitted into the concave portion 20a. The window portion 22a is formed by cutting out a part of the sheet material 22 in a circular shape and has a perfect circular shape in plan view.

A cutout portion 21a having a substantially rectangular shape in plan view is formed at the frame 21. The frame 21 can be formed of, for example, a resin material. The frame 21 may or need not have flexibility, however, when the frame 21 has flexibility to some extent, a breakage prevention effect is obtained.

The sheet material 22 is a sheet made of resin having translucency, and for example, a PET (polyethylene terephthalate) sheet can be used. The sheet material 22 is attached to a lower surface of the frame 21 by a double-sided tape (not illustrated), and when the measurement guide 20 is placed on the measurement target G, the sheet material 22 contacts the measurement target G, and the frame 21 does not contact the measurement target G.

As an example of coating treatment, hard coat treatment is performed on the lower surface of the sheet material 22, that is, a surface that contacts the measurement target G. As an example, a thickness of the entire sheet material 22 is about 0.1 mm. When the thickness of the sheet material 22 is increased, an interval between the measurement target G and the colorimetric device 1 is increased, which adversely affects a colorimetric value, therefore, it is suitable that the thickness of the sheet material 22 is as small as possible.

Figure 4:
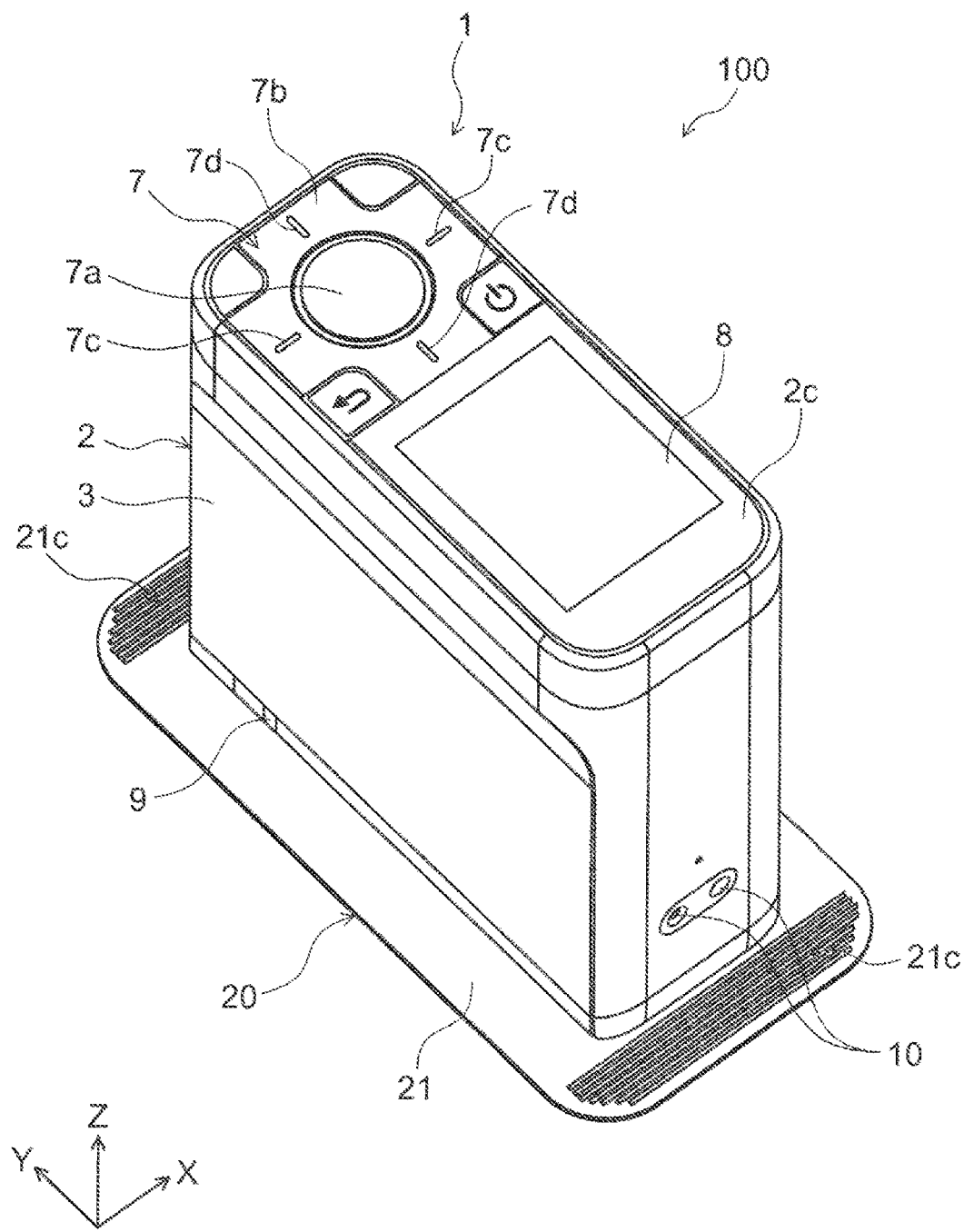
FIG. 4 is a perspective view of a colorimetric system viewed from above and is a perspective view of a state in which the colorimetric device is fitted into the measurement guide.
Figure 7:
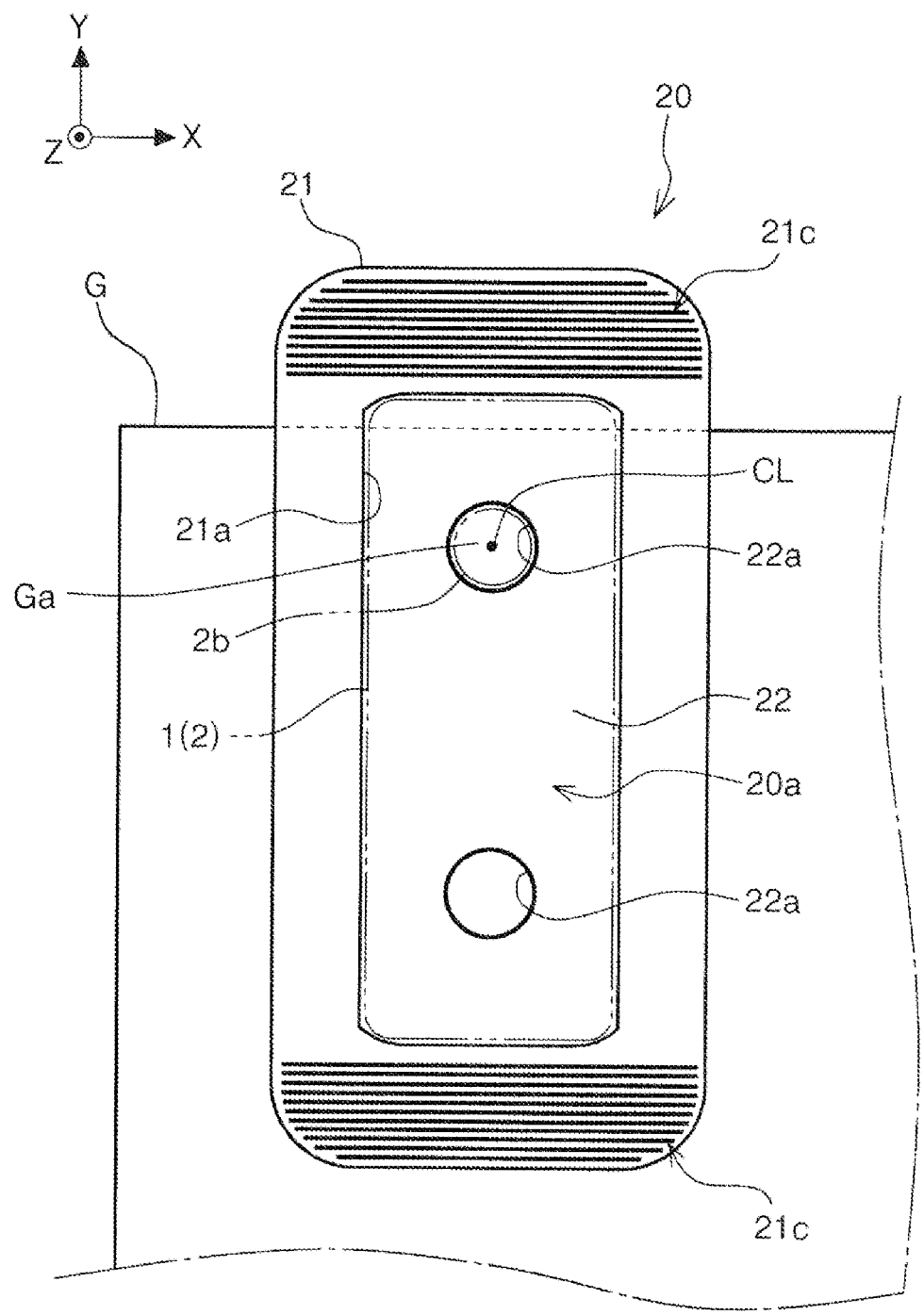
FIG. 7 is a plan view of the measurement guide.

As illustrated in FIG. 4, the bottom portion 2a of the colorimetric device 1 can be fitted into the concave portion 20a of the measurement guide 20. Therefore, as illustrated in FIG. 7, the outer periphery of the concave portion 20a, that is, an inner periphery of the cutout portion 21a of the frame 21 has a shape along an outer periphery of the bottom portion 2a of the colorimetric device 1. In other words, the concave portion 20a is formed so that an interval between a side surface close to the bottom portion of the device main body 2 and an inner periphery of the concave portion 2a can be made uniform along the outer periphery of the bottom portion 20a, and the interval is set to 0.5 mm as an example. The interval may be at least 1.0 mm or less, and may be large enough to allow the bottom portion 2a of the colorimetric device 1 to reliably enter the concave portion 20a.

A depth h1 of the concave portion 20a (see FIG. 6) is set to about 2 mm as an example. The depth h1 of the concave portion 20a can be appropriately set, but may be such a depth that the colorimetric device 1 and the measurement guide 20 do not easily move relative to each other in the X-Y plane when the bottom portion 2a of the colorimetric device 1 is fitted.

Figure 5:
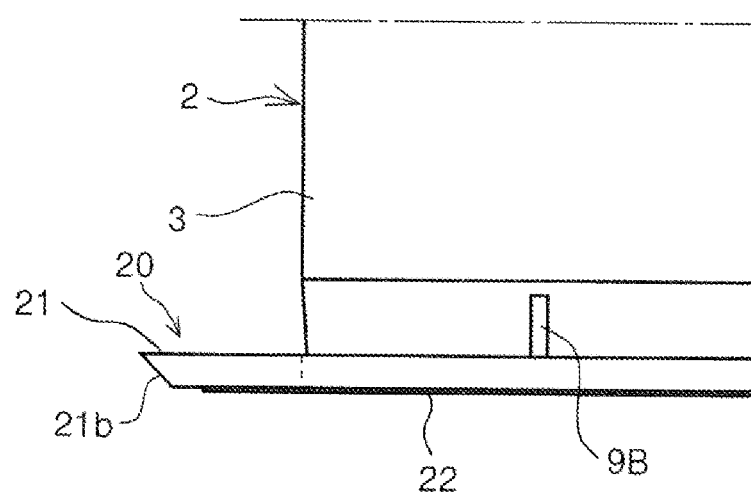
FIG. 5 is a view of a part of the colorimetric system viewed from a side and is a side view of a state in which the colorimetric device is fitted into the measurement guide.
Figure 5:
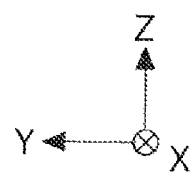

Additionally, as illustrated in FIG. 5, the depth h1 of the concave portion 20a is set to such a depth that the position marks 9A and 9B are not hidden. In other words, lengths of the position marks 9A and 9B in the Z-axis direction are set to be longer than the depth h1 of the concave portion 20a.

The bottom portion 2a of the colorimetric device 1 has a substantially rectangular shape when viewed from the −Z direction, and has a line-symmetric shape in the X-axis direction and the Y-axis direction. Accordingly, the concave portion 20a also has a substantially rectangular shape similarly and has a line-symmetric shape in the X-axis direction and the Y-axis direction. Further, the frame 21 also has a substantially rectangular shape and has a line-symmetric shape in the X-axis direction and the Y-axis direction.

Therefore, the colorimetric device 1 can be fitted into the concave portion 20a in any direction. In addition, the two window portions 22a are also formed so that the colorimetric device 1 may be fitted into the concave portion 20a in any direction.

Note that an anti-slip portions 21c are formed at a +Y direction end portion and a −Y direction end portion of an upper surface of the frame 21. The anti-slip portion 21c is formed as fine projections and depressions by forming a plurality of ribs extending in the X-axis direction in the Y-axis direction.

Figure 6:
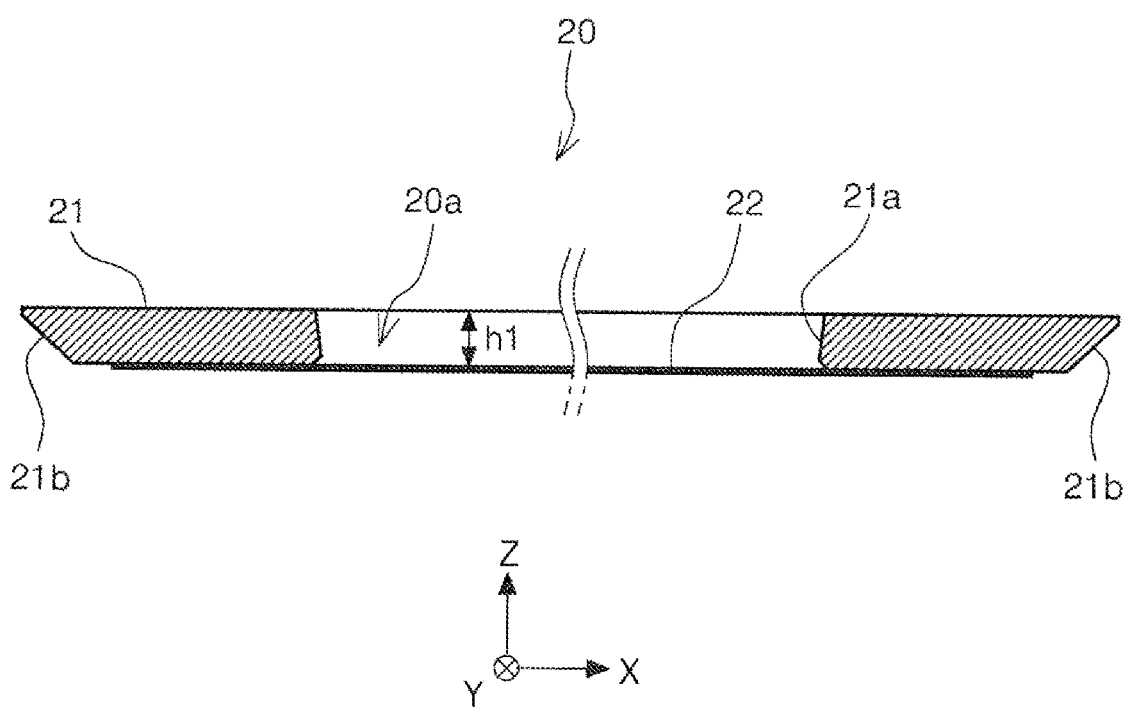
FIG. 6 is a cross-sectional view of the measurement guide cut along an X-Z plane and is a cross-sectional view taken along a line A-A in FIG. 7.

Further, a chamfered portion 21b is formed over an entire periphery of the frame 21 at the lower surface of the frame 21 (see FIGS. 5 and 6).

The colorimetric device 1 and the measurement guide 20 described above constitute a colorimetric system 100.

When the measurement target G is measured using the colorimetric device 1 and the measurement guide 20 described above, first, as illustrated in FIG. 7, the window portion 22a of the measurement guide 20 is aligned with the measurement site Ga of the measurement target G. In this state, the bottom portion 2a of the colorimetric device 1 is fitted into the concave portion 20a of the measurement guide 20. As a result, the opening portion 2b of the colorimetric device 1 and the window portion 22a are aligned with each other, and the measurement site Ga can be measured without a position shift.

An outer diameter of the window portion 22a is larger than an outer diameter of the opening portion 2b and is formed to have such a size that the opening portion 2b is accommodated inside the window portion 22a even when the colorimetric device 1 moves to some extent due to an interval between the concave portion 20a and the colorimetric device 1.

As described above, the measurement guide 20 has the concave portion 20a and is configured such that the bottom portion 2a of the colorimetric device 1 is fitted into the concave portion 20a. The bottom surface of the concave portion 20a is formed of the sheet material 22 having translucency, and at the sheet material 22, the window portion 22a is formed at a position aligned with the opening portion 2b of the colorimetric device 1, that is, overlapping the opening portion in plan view in a state in which the bottom portion 2a of the colorimetric device 1 is fitted into the concave portion 20a. Since the sheet material 22 has translucency, the window portion 22a can be easily aligned with the measurement site Ga. When the bottom portion 2a of the colorimetric device 1 is fitted into the concave portion 20a in this state, the window portion 22a is aligned with the opening portion 2b, therefore, the colorimetric device 1 can be accurately and easily aligned with the measurement site Ga, and an appropriate colorimetric result is obtained.

Note that the sheet material 22 having translucency means not only that the sheet material 22 is completely transparent but also that the measurement target G is visible and the window portion 22a can be aligned with the measurement site Ga even when the sheet material 22 is semi-transparent or colored.

In addition, in the present embodiment, the frame 21, that is, the measurement guide 20 has a rectangular shape along the outer periphery of the bottom portion 2a of the colorimetric device 1, and has a line-symmetric shape in the longitudinal direction (Y-axis direction) and the short direction (X-axis direction). As a result, the user can handle the measurement guide 20 in the same manner using either the right hand or the left hand.

In addition, in the present embodiment, the opening portion 2b of the colorimetric device 1 is located at a position deviated in the +Y direction in the Y-axis direction, that is, at a position deviated in the +Y direction in the longitudinal direction of the bottom portion 2a. Then, the plurality of (two) window portions 22a are formed so as to form a line-symmetric positional relationship in the Y-axis direction, that is, the longitudinal direction. As a result, the user can use the measurement guide 20 without worrying about orientation of the measurement guide 20, and usability for the user is improved.

Further, in the present embodiment, since the anti-slip portion 21c is formed at the upper surface of the frame 21, operability is improved when the measurement guide 20 is slid with respect to the measurement target G.

In addition, in the present embodiment, since the coating treatment is performed on the surface of the sheet material 22 facing the measurement target G, it is possible to improve wear resistance of the sheet material 22.

Further, in the present embodiment, since the outer periphery of the bottom portion 2a of the frame 21 is chamfered, when the measurement guide 20 is lifted by fingertips, the fingertips are easily caught, and the handleability is improved. The chamfer of the outer periphery of the bottom portion 2a may be an R surface or a C surface.

In addition, in the present embodiment, the position marks 9A and 9B indicating the center position of the opening portion 2b are formed at positions of the side surfaces of the colorimetric device 1 facing the bottom portion 2a, and the concave portion 20a is formed to have such a depth that the position marks 9A and 9B are not hidden when the bottom portion 2a of the colorimetric device 1 is fitted. Accordingly, even in a state in which the bottom portion 2a of the colorimetric device 1 is fitted into the concave portion 20a, the position marks 9A and 9B are visible, and the position of the opening portion 2b can be grasped, so that convenience for the user is improved.

Figure 8A:
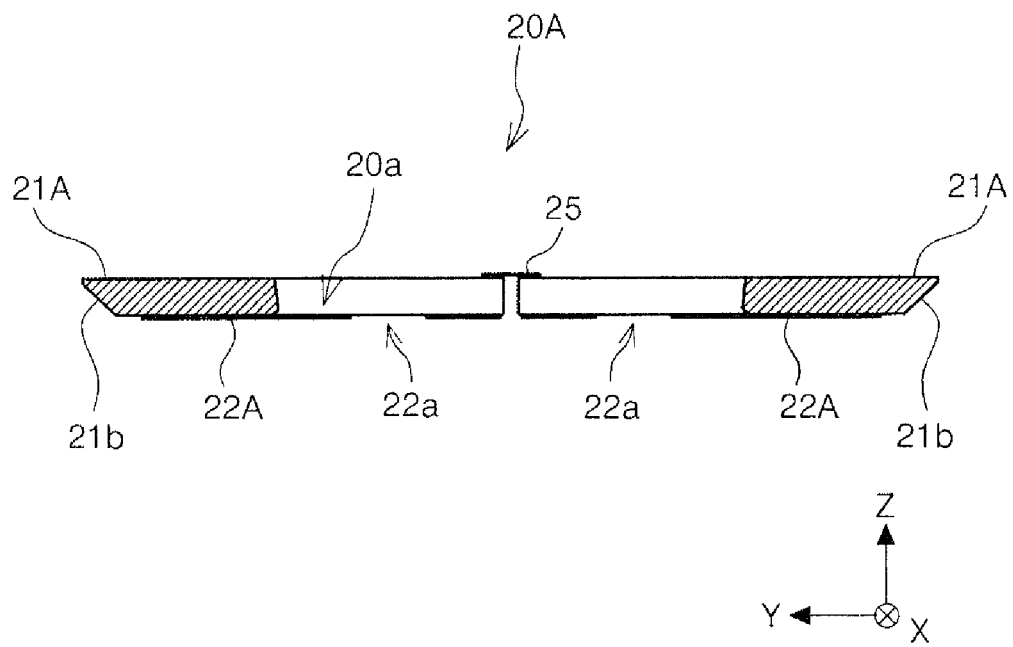
FIGS. 8A and 8B are cross-sectional views of a measurement guide according to another embodiment taken along a Y-Z plane.
Figure 8B:
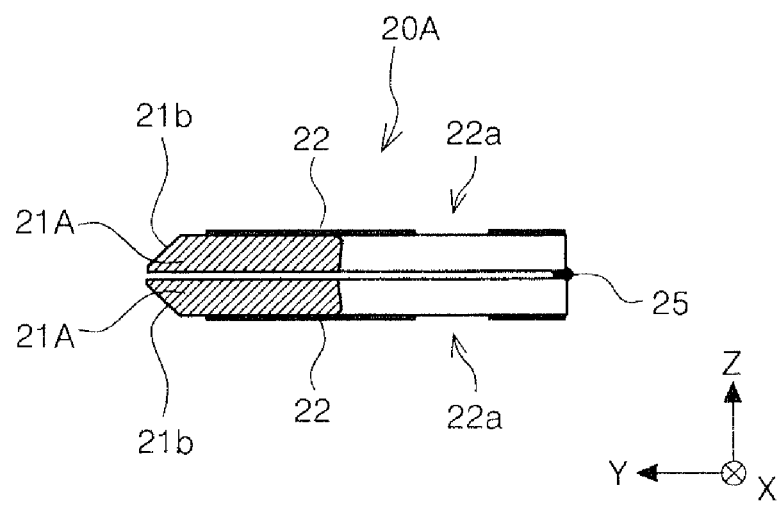

Note that it is also suitable that the measurement guide 20 is foldable. FIGS. 8A and 8B illustrate a foldable measurement guide 20A, and elements identical to those described above are provided with identical reference numerals. The measurement guide 20A has structure in which the above-described measurement guide 20 is divided into two parts in a longitudinal direction, and the two parts are rotatably linked to each other. A sheet material 22A is attached to a frame 21A, and the two frames 21A are linked by a linking sheet 25. The linking sheet 25 is a flexible sheet material, but the two frames 21A may be linked to each other by a hinge or the like instead of such a sheet material.

FIG. 8A illustrates a state in which the measurement guide 20A is used, and FIG. 8B illustrates a state in which the measurement guide 20A is folded. In the folded state, a length of the measurement guide 20A in the Y-axis direction is shorter than a length of the colorimetric device 1 in the Y-axis direction, thereby improving storage properties of the measurement guide 20A. For example, both the colorimetric device 1 and the measurement guide 20A can be stored in a storage case (not illustrated) capable of storing the colorimetric device 1.

Further, the present disclosure is not limited to the above-described examples, various modification can be made within the scope of the disclosure as described in the appended claims, and it is needless to say that the modifications also fall within the scope of the disclosure.

What is claimed is:

1. A measurement guide for aligning an opening portion of a colorimetric device with a measurement site of a measurement target, the colorimetric device including
the opening portion provided at a bottom portion of a device main body and through which light arriving from the measurement target is introduced into the device main body and
an incident light processing unit for processing light entering through the opening portion, the measurement guide comprising:
a frame configured to form an outer periphery of a concave portion into which the bottom portion is fitted; and
a sheet material having translucency and configured to form a bottom surface of the concave portion, wherein
the sheet material has a window portion that aligns with the opening portion when the bottom portion is fitted into the concave portion.

2. The measurement guide according to claim 1, wherein
the bottom portion of the colorimetric device has a rectangular shape in plan view, and
the frame has a rectangular shape along an outer periphery of the bottom portion and has a line-symmetric shape in a longitudinal direction and a short direction.

3. The measurement guide according to claim 2, wherein
the opening portion of the colorimetric device is located at a position deviated in a predetermined direction in a longitudinal direction of the bottom portion, and
a plurality of the window portions are formed so as to form a line-symmetric positional relationship in the longitudinal direction of the bottom portion.

4. The measurement guide according to claim 1, wherein
an anti-slip portion is formed at an upper surface of the frame.

5. The measurement guide according to claim 1, wherein
the sheet material is attached to a bottom surface of the frame, and
coating treatment is performed on a surface of the sheet material facing the measurement target.

6. The measurement guide according to claim 1, wherein
an outer periphery of a bottom surface of the frame is chamfered.

7. The measurement guide according to claim 1, wherein
a position mark indicating a center position of the opening portion is formed at a position facing the bottom portion of a side surface of the colorimetric device, and
the concave portion is formed to have such a depth that the position mark is not hidden when the bottom portion of the colorimetric device is fitted.

8. A colorimetric system, comprising:
a colorimetric device including an opening portion provided at a bottom portion of a device main body and through which light arriving from a measurement target is introduced into the device main body and an incident light processing unit for processing light entering through the opening portion; and
the measurement guide according to claim 1 configured to align the opening portion with a measurement site of the measurement target.

* * * * *